(12) United States Patent
Burns et al.

(10) Patent No.: US 7,433,450 B2
(45) Date of Patent: Oct. 7, 2008

(54) METHOD AND SYSTEM FOR CONNECTION VERIFICATION

(75) Inventors: Dave J. Burns, Ottawa (CA); Norman Robertson, Kanata (CA)

(73) Assignee: IXIA, Calabasas, CA (US)

( * ) Notice: Subject to any disclaimer, the term of this patent is extended or adjusted under 35 U.S.C. 154(b) by 1103 days.

(21) Appl. No.: 10/670,261

(22) Filed: Sep. 26, 2003

(65) Prior Publication Data

US 2005/0068972 A1    Mar. 31, 2005

(51) Int. Cl.
*H04M 1/24* (2006.01)
*H04M 3/08* (2006.01)
*H04M 3/22* (2006.01)

(52) U.S. Cl. .......................... 379/9; 379/1.04; 379/9.04; 379/12; 379/27.01; 379/29.01; 379/29.1; 370/241; 370/248

(58) Field of Classification Search ................. 379/1.01, 379/1.03, 1.04, 9, 9.02, 9.04, 10.01, 15.01, 379/22.05, 27.01, 29.01, 29.05, 12, 29.1; 370/241, 244, 247, 251, 248
See application file for complete search history.

(56) References Cited

U.S. PATENT DOCUMENTS

| | | | |
|---|---|---|---|
| 5,619,489 A | 4/1997 | Chang | |
| 5,796,953 A | 8/1998 | Zey | |
| 5,835,565 A | 11/1998 | Smith | |
| 5,835,566 A | 11/1998 | Cowgill | |
| 5,838,919 A | 11/1998 | Schwaller et al. | |
| 5,933,475 A | 8/1999 | Coleman | |
| 5,982,852 A | 11/1999 | Schwartz | |
| 6,031,528 A | 2/2000 | Langfahl, Jr. | |
| 6,189,031 B1 | 2/2001 | Badger | |
| 6,201,853 B1 | 3/2001 | Butler | |
| 6,212,258 B1 | 4/2001 | Bella et al. | |

(Continued)

FOREIGN PATENT DOCUMENTS

CA    2338682 A1    12/2000

(Continued)

OTHER PUBLICATIONS

Documentation from http://www.ando.co.jp being the website for Ando Electric Co., Ltd.: (i) home page; (ii) Products info; (iii)Measuring instruments; and (iv) xDSL loop Tester, LX100.

Office Action dated Feb. 26, 2008 in U.S. Appl. No. 11/002,078 filed Dec. 3, 2004, Burns, 5 pp.

*Primary Examiner*—Binh K. Tieu
(74) *Attorney, Agent, or Firm*—SoCal IP Law Group LLP; Steven C. Sereboff; John E. Gunther

(57) ABSTRACT

The present invention provides a method and system for connection verification. An embodiment includes a DSL based system, with a tester resident at a central office respective to a DSLAM. When a problem is encountered by a subscriber, the tester can be readily connected to the DSLAM to allow performance of tests on the connection between the tester, the DSLAM and the Internet. If such tests are successful, then service provider can eliminate that portion of the link as the source of the connectivity problem. If unsuccessful, the service provider can repair that portion of the connection, and thereby potentially obviate the need to send a technician to the subscriber premises.

10 Claims, 7 Drawing Sheets

U.S. PATENT DOCUMENTS

| | | |
|---|---|---|
| 6,278,769 B1 | 8/2001 | Bella |
| 6,363,056 B1 | 3/2002 | Beigi et al. |
| 6,397,359 B1 | 5/2002 | Chandra et al. |
| 6,414,958 B1 | 7/2002 | Specht |
| 6,434,221 B1 * | 8/2002 | Chong .................... 379/27.01 |
| 6,473,798 B1 | 10/2002 | Grosser et al. |
| 6,477,238 B1 * | 11/2002 | Schneider et al. ........ 379/22.04 |
| 6,510,463 B1 | 1/2003 | Farhat et al. |
| 6,578,309 B1 * | 6/2003 | Frisce ........................... 42/94 |
| 6,580,727 B1 | 6/2003 | Yim et al. |
| 6,594,343 B1 * | 7/2003 | Duffie et al. ............... 379/1.01 |
| 6,606,372 B2 * | 8/2003 | Yi et al. .................... 379/1.04 |
| 6,687,335 B1 | 2/2004 | Jones |
| 6,804,624 B2 * | 10/2004 | Silverman .................. 702/159 |
| 6,819,746 B1 * | 11/2004 | Schneider et al. ........ 379/29.01 |
| 2003/0083842 A1 | 5/2003 | Miller et al. |
| 2003/0188003 A1 | 10/2003 | Sylvest et al. |
| 2003/0204611 A1 | 10/2003 | McCosh et al. |
| 2003/0218984 A1 | 11/2003 | Tanaka |
| 2004/0010627 A1 | 1/2004 | Ellis et al. |
| 2005/0025189 A1 | 2/2005 | Smith |
| 2005/0135392 A1 * | 6/2005 | Burns et al. .................. 370/401 |
| 2006/0244462 A1 * | 11/2006 | McCosh et al. ............. 324/522 |
| 2007/0121792 A1 | 5/2007 | Chong |

FOREIGN PATENT DOCUMENTS

| | | |
|---|---|---|
| CA | 2448909 A1 | 12/2002 |
| CA | 2 359 991 A1 | 3/2003 |
| JP | 2000332755 A | 11/2000 |
| WO | WO 02/14977 A2 | 2/2002 |
| WO | WO 02/17571 A1 | 2/2002 |
| WO | WO 02/056541 A3 | 7/2002 |
| WO | WO 2004/066601 A1 | 8/2004 |
| WO | WO 2005/032047 A1 | 4/2005 |
| WO | PCT/CA2005/001931 | 4/2006 |

* cited by examiner

METHOD AND SYSTEM FOR CONNECTION VERIFICATION

FIELD OF THE INVENTION

The present invention relates generally to computer networking and more particularly to a system and method for connection verification.

BACKGROUND OF THE INVENTION

Solving the "last-mile" problem has been an important piece of providing ubiquitous, high-speed Internet access to business and residential customers ("subscribers") at their premises. Digital Subscriber Line ("DSL") and CATV Internet services, are now well-entrenched means of solving the last-mile problem. Internet over satellite is now being offered by various telecommunication service providers, and land-based fixed wireless solutions such as those being promulgated by companies such as Soma Networks Inc. of San Francisco Calif., also offer the promise of effective last-mile solutions. See for example WO0189096A2 published Nov. 22, 2001.

A common feature of last mile solutions is a switching station that has a gateway connected to the Internet via a backhaul, such as a T1, T3, or a virtual network or the like. The gateway interfaces the backhaul with the particular communication medium or channel used to deliver the Internet service to the subscriber premises.

In DSL (and its variants, commonly referred to xDSL) the switching station is typically a central office as commonly found in the public switched telephone network ("PSTN"), and the gateway is a Digital Subscriber Line Access Module ("DSLAM"). The communication medium is typically the traditional twisted pair of copper wires that run between the central office and subscriber premises, and normally connect to a plain old telephone service ("POTS") telephone in the subscriber premises. Where the subscriber is a DSL customer, the twisted pair of copper wires in the customer premises are also connected to a DSL modem, which in turn connects to the subscriber's computer or intranet.

Problems with the foregoing arise when a subscriber loses, or believes they have lost, Internet connectivity. To troubleshoot this problem, it is common for the service provider to send a service technician to the subscriber premises. To verify Internet connectivity, the service technician can attempt to make their own Internet connection from the subscriber premises in order to assess whether a connectivity problem actually exists, and if so, to attempt to determine the nature of the problem. However, such use of service technicians can be wasteful, particularly where the technician discovers that no connectivity problem exists and that the subscriber's problems are in fact related to the subscriber's proprietary equipment, or other equipment located at the subscriber's premises. Where connectivity problems are found to exist, then the service provider is faced with the additional cost of dispatching a service technician to the central office housing the DSLAM to perform further troubleshooting. In fact, where connectivity problems are found to exist at the DSLAM, it is actually common to simply change the subscriber's port on the DSLAM, without troubleshooting the cause. This can lead to having DSLAMs with several unused ports, as the service provider may elect not to troubleshoot those DSLAMs due to costs and labour issues surrounding the administration of central offices.

SUMMARY OF THE INVENTION

It is an object of the present invention to provide a novel system and method for connection verification that obviates or mitigates at least one of the above-identified disadvantages of the prior art.

An aspect of the invention provides a method of verifying a connection between a subscriber station and a network wherein a gateway resides intermediate the subscriber station and the network, the method comprising the steps of:
introducing a tester into the connection;
remotely instructing the tester to perform at least one connectivity test between the gateway and the network; and
generating an output reporting a result of the at least one connectivity test.

The gateway can be a DSLAM, and the portion of the connection between the gateway and the subscriber station includes a copper twisted pair. The network can be the Internet and the portion of the connection between the gateway and network can a backhaul to the Internet, such as a T3, T1 etc.

The tester can be introduced via a remote instruction from a verification host computer.

The tester can be introduced into the connection at the gateway.

The gateway can be a DSLAM at a telephone central office and the tester can be introduced into the DSLAM using a manual connection.

The method can further comprise the step of remotely instructing the tester to perform at least one additional connectivity test between the gateway and the subscriber station and wherein the report includes a result of the at least one additional connectivity test. The at least one additional connectivity test can be a metal test of a copper twisted pair that forms at least part of the connection between the gateway and the subscriber station. The remote instructions can originate from a verification host connected to the tester and the report will be outputted to the verification host. The at least one connectivity test can comprises "pinging" the tester from the host via the Internet. The report can include ping statistics delivered to the host.

The verification host can be connected to the tester via a virtual link through the Internet.

Where the subscriber station has a dynamic IP address, the method can further comprise the steps of, after the introducing step:
remotely providing the dynamic IP address to the tester via a DHCP server;
sending the dynamic IP address from the tester to the host via the Internet.

The verification host can be connected to the tester via a link independent of the network.

Where the subscriber station has a static IP address, the method can further comprise the step of remotely providing the static IP address to the tester via the link.

Another aspect of the invention provides a system for verifying a connection between a subscriber station and a network wherein a gateway resides intermediate the subscriber station and the network, the method comprising the steps of:
means for introducing a tester into the connection;
means for remotely instructing the tester to perform at least one connectivity test between the gateway and the network; and
means for generating an output reporting a result of the at least one connectivity test.

Another aspect of the invention provides a system for verifying a connection comprising a subscriber station and a network connected to the subscriber station via a gateway. The gateway is operable to translate communications between the subscriber station and the network. The system also comprises a tester for connection into the network. The tester is operable to receive remote instructions to perform at least one connectivity test over at least a portion of a connection spanning the subscriber station and the network. The system also includes a host connected to the tester for remotely instructing the tester to perform the at least one connectivity test and to receive reports thereof from the tester.

Another aspect of the invention provides a method of remotely verifying a connection between a subscriber station and a network wherein a gateway resides intermediate the subscriber station and the network, the method comprising the steps of:
remotely triggering the introduction of a tester into the connection, the tester operable to perform link and connectivity tests;
performing a test of a link between the gateway and the subscriber station;
performing a connectivity test between the gateway and the network; and
reporting the status of the connection to a remote location.

Another aspect of the invention provides a system for remotely verifying a connection between a subscriber station and a network wherein a gateway resides intermediate the subscriber station and the network, the system comprising: a remote control terminal and a tester coupled remotely to the remote control terminal and operable to be introduced into the connection and controlled by the remote control terminal. The tester is operable to receive a connection test message from the remote control terminal and in response, conduct at least one of: a test of a link between the gateway and the subscriber station and a test between the gateway and the network. The tester is further operable to report results of the tests. The system also comprises a remote reporting terminal coupled remotely to the tester and operable to receive and process the results of the tests.

Another aspect of the invention provides a method of remotely verifying a connection between a subscriber station and a network wherein a gateway resides intermediate the subscriber station and the network, the method comprising the steps of:
remotely triggering a tester to be introduced into the connection;
instructing the tester to perform a test of a link between the gateway and the subscriber station;
instructing the tester to perform a connectivity test between the gateway and the network; and
receiving and reporting of the status of the connection.

Another aspect of the invention provides a apparatus for controlling verification of a connection between a subscriber station and a network from a remote location, wherein a gateway resides intermediate the subscriber station and the network, the apparatus comprising:
an interface operable to be coupled to a tester;
a processing unit operable to instruct the tester to be introduced into the connection and further operable to conduct a test of a link between the gateway and the subscriber station, the processing unit further operable to instruct the tester to conduct a connectivity test between the gateway and the network and report of the status of the connection; the processing unit further operable to receive and output the report of the status of the connection.

Another aspect of the invention provides a test apparatus for remotely verifying a connection between a subscriber station and a network wherein a gateway resides intermediate the subscriber station and the network, the test apparatus comprising: a first interface operable to be coupled to a remote control terminal and a second interface operable to introduce the tester to the connection. The apparatus also includes a processing unit operable to receive connection test messages from the remote control terminal and, upon reception of a connection test message, the apparatus is further operable to conduct a test of a link between the gateway and the subscriber station, and to conduct a connectivity test between the gateway and the network, and to transmit a report of the status of the connection to a remote location.

Another aspect of the invention provides a method of remotely verifying layer 3 connectivity for a subscriber station wherein a gateway resides intermediate in a connection between the subscriber station and a layer 3 network, the method comprising the steps of:
remotely triggering a tester to be introduced into the connection;
performing a layer 3 connectivity test between the gateway and the network; and
reporting the status of the layer 3 connectivity to a remote location.

Another aspect of the invention provides a system for remotely verifying layer 3 connectivity for a subscriber station wherein a gateway resides intermediate in a connection between the subscriber station and a layer 3 network The system comprises a remote control terminal and a tester coupled remotely to the remote control terminal. The tester is operable to be introduced into the connection and controlled by the remote control terminal. The tester is operable to receive a connectivity test message from the remote control terminal and in response, conduct a layer 3 connectivity test between the gateway and the network, and report the results of the connectivity test. The system also comprises a remote reporting terminal coupled remotely to the tester and operable to receive and process the results of the connectivity test.

Another aspect provides a method of verifying a connection between a subscriber station and a network wherein a gateway operated by a service provider resides intermediate the subscriber station and the network, the method comprising the steps of:
determining that a problem exists with the connection;
introducing a tester controllable by the service provider into the connection;
instructing the tester to perform a test of a link between the gateway and the subscriber station;
repairing the link if the link test fails and terminating the method if the problem is resolved;
if the problem remains unresolved, instructing the tester to perform a connectivity test between the gateway and the network;
repairing the gateway if the connectivity test fails;

Another aspect of the invention provides tester introducible to a connection spanning a subscriber station, a gateway and a network. The tester comprises a interface for introducing the tester to the connection, and a processing unit that is operable to receive remote instructions to perform at least one connectivity test over at least a portion of the connection. The processing unit in the tester is further operable to output results of the at least one connectivity test over the interface.

Another aspect of the invention provides a verification host for conducting a remote test of a connection spanning a subscriber station, a gateway and a network via a tester introduced into the connection. The tester is operable to receive remote instructions from the host and is also operable to perform at least one connectivity test over at least a portion of the connection network. The host comprises an interface for remotely connecting to the tester via a link, and an input device for receiving input from a user representing instructions to the tester to perform the at least one connectivity test. The host also comprises a processing unit for receiving the input and relaying the instructions to the tester via the interface and the link. The processing unit is also for receiving results of the connectivity test from the tester via the interface. The host also comprises an output device for presenting the results to the user.

BRIEF DESCRIPTION OF THE DRAWINGS

The invention will now be described by way of example only, and with reference to the accompanying drawings, in which.

DETAILED DESCRIPTION OF THE INVENTION

Figure 1:
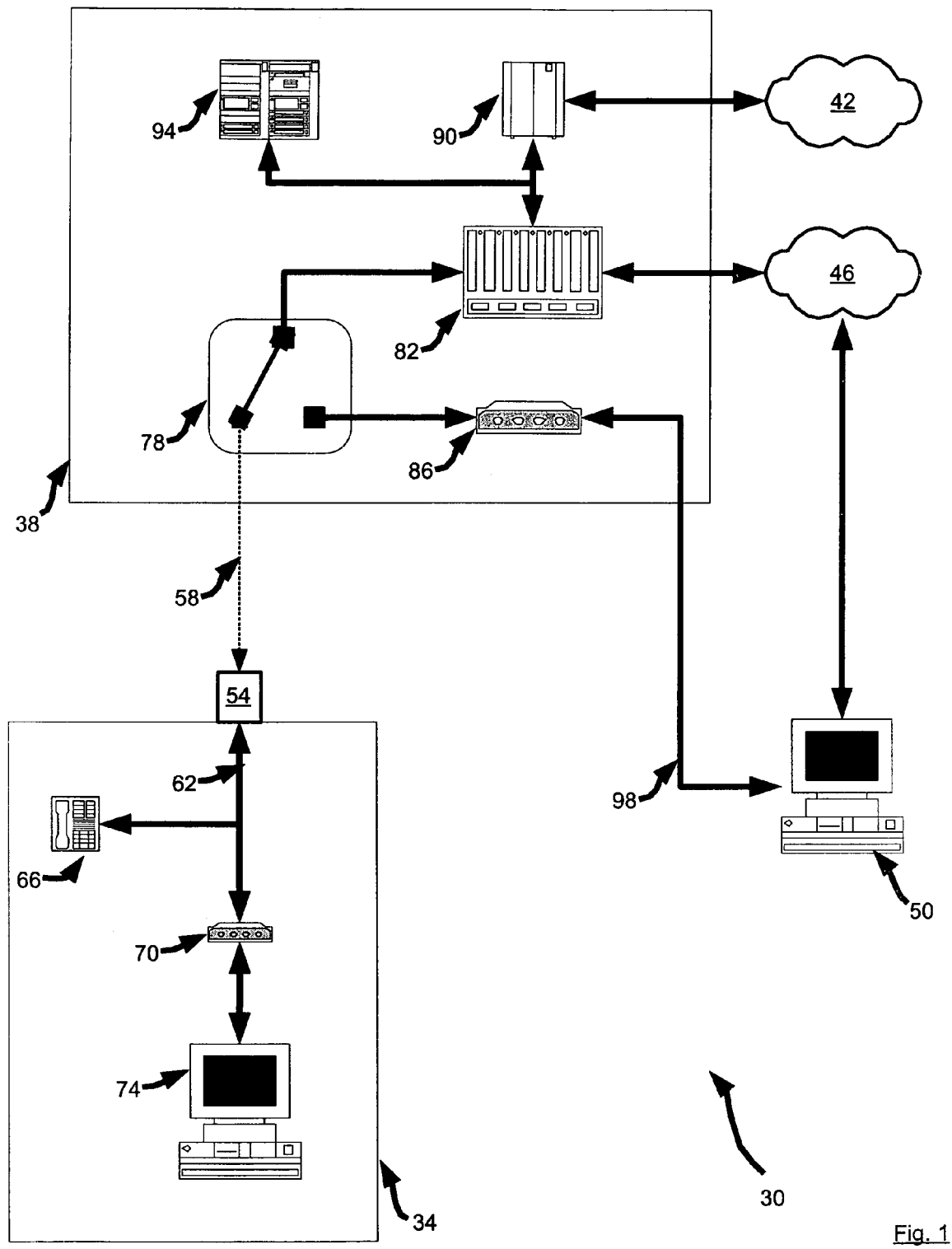
FIG. 1 is a schematic representation of a system for connection verification in accordance with an embodiment of the invention.

Referring now to FIG. 1, a system for connection verification is indicated generally at 30. System 30 comprises at least one subscriber premises 34 that is connected to a central office 38. In turn, central office 38 is connected to both the PSTN 42 and the Internet 46. Internet 46 is also connected to an access verification host 50.

Subscriber premises 34 is characterized by a subscriber junction 54 that connects to a POTS copper wire twisted pair 58 that runs between subscriber premises 34 and central office 38. It should be understood that twisted pair 58 represents all of the components that typically lie along the path of pair 58, including junction boxes, bridges etc. Junction 54 also connects to subscriber wiring 62, which reflects the internal telephone wiring of premises 34. Thus, subscriber premises 34 is also characterized by a POTS telephone 66, a DSL modem 70, and an Internet client 74, all of which connect to junction 54 over subscriber wiring 62. Internet client 74 is any computing device, such a personal computer, server, personal digital assistant or the like that is operable to conducting communications over Internet 46. It is to be clarified that the particular equipment configuration of subscriber premises 34 is merely exemplary, and other configurations of subscriber premises can include any number of other communication appliances and arrangements thereof, such as additional POTS telephones, a private branch exchange ("PBX"), a wireless access point ("WAP"), firewalls, gateway routers, print servers, file servers, email servers, intranets, or the like. Additionally, it is to be clarified that subscriber premises 34 can belong to residential, business or any other type of subscriber.

Figure 2:
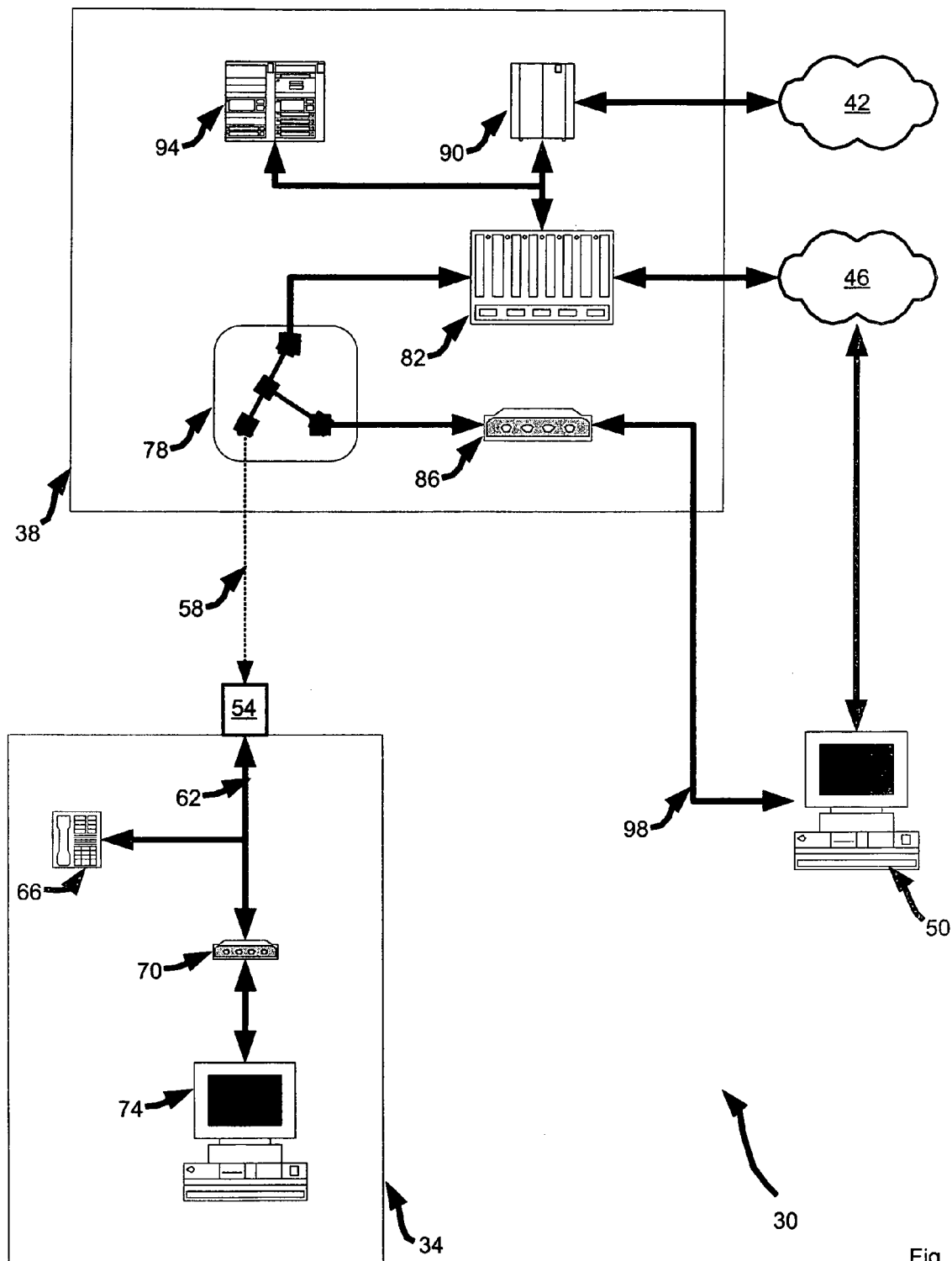
FIG. 2 shows the system of FIG. 1 with the junction switch in a second position.
Figure 3:
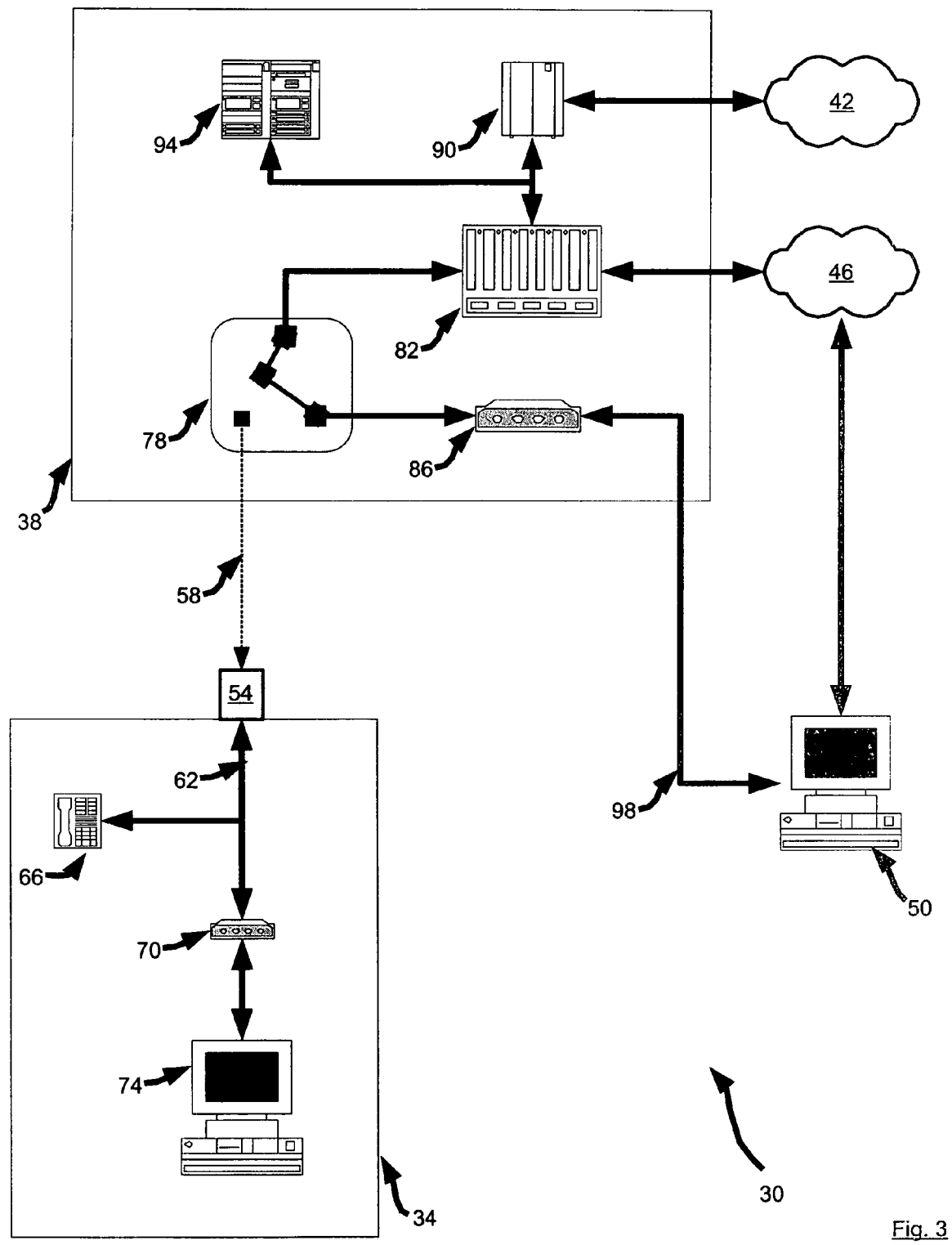
FIG. 3 shows the system of FIG. 1 with the junction switch in a third position.

Central office 38 is characterized by a central office junction 78 that connects the end of twisted pair 58 opposite to subscriber premises 34. Junction 78 has at least two positions. In a first position, shown in FIG. 1, central office junction 78 connects twisted pair 58 to a DSLAM 82. In a second position, shown in FIG. 2, junction 78 connects twisted pair 58 to DSLAM 82 and a tester 86. In a third position, shown in FIG. 3, junction 78 connects DSLAM 82 to tester 86. In a present embodiment, changes to junction 78 are effected manually by use of a "shoe" as such a device is commonly referred to by various telecommunication industry workers. In particular, a technician assigned to central office 38 will be instructed to effect a change in junction 78 from the first position in FIG. 1 the second position in FIG. 2, by means of connecting a "shoe" to the port on DSLAM 82 to which twisted pair 58 is connected. It is to be understood, however, that in other embodiments that junction 78 can be effected through other means, simply by running a jumper from DSLAM 82 to tester 86. Changes to the position of junction 78 can also be automated, such as through a digital cross connection or other electronic switching circuitry that is operable from host 50, such that an operator of host 50 can selectively, and remotely, cause junction 78 to move between the various positions shown in FIGS. 1, 2 and 3. DSLAM 82 is any known DSLAM such as the Alcatel Standard Density DSLAM, Model 1000 ADSL from Alcatel USA, Inc., 3400 W. Plano Parkway, Plano, Tex. 75075, or the Alcatel High HI Density DSLAM, Model 7300 ASAM also available from Alcatel USA, Inc. DSLAM 82 is generally operable to act as a gateway between Internet 46 and twisted pair 58 and thereby allow client 74 to communicate over Internet 46.

Tester 86 includes functionality inherent Alcatel Speed Touch 1000 Golden Modem, available from Alcatel USA, Inc., 3400 W. Plano Parkway, Plano, Tex. 75075 in that tester 86 is operable, when junction 78 is in the second position shown in FIG. 2, and in conjunction with a toll grade test head, (not shown), such as the Tollgrade Digitest Access Unit, Model DAU 1000, available from Tollgrade. to run a series of "metal tests" over twisted pair 58. As is understood by those of skill in the art, such "metal tests" ascertain whether twisted pair 58 possesses physical, electrical, and mechanical integrity for carrying DSL signals between DSLAM 82 and junction 54. In other words, such metal tests determine whether any physical damage or degradation has occurred over twisted pair 58, and such tests can ascertain whether twisted pair 58 is even physically capable of carrying the internet protocol ("IP") signals generated by DSLAM 82 and modem 70. As will be explained in greater detail below, tester 86 is also operable to interact directly with DSLAM 82 and to thereby conduct its own communications, and communication tests, over Internet 46.

Central office 38 also includes a PSTN switch 90 that is connected to subscriber premises 34 through DSLAM 82. PSTN switch 90 is also connected to PSTN 42, and is generally operable to switch telephone conversations between PSTN switch 90 and telephone 66.

In a present embodiment, central office 38 also includes a Dynamic Host Configuration Protocol ("DHCP") server 94 that is operable to dynamically assign an IP address to modem 70 at such time that modem 70 successfully communicates with DSLAM 82. It will now be understood that, in the present embodiment, system 30 is based on dynamic IP addresses, but it is to be understood that in other embodiments, DHCP server 94 can be eliminated where the system is based on static IP addresses, or the system can be a hybrid system where some subscribers have dynamic IP addresses, while others have static IP addresses. In a present embodiment, the functionality of DHCP server 94 is provided via a Redback SMS-100, from Redback Networks Inc., 300 Holger Way, San Jose, Calif. 95134-1362. As will be explained in greater detail below, when tester 86 is connected to DSLAM 82, tester 86 is operable to request an IP address from server 94.

Access verification host 50, in a present embodiment, is simply an Internet enabled computing device that is operable to communicate directly with tester 86 over a communication link 98. In a present embodiment, link 98 is a separate communication link from Internet 46, however, it is to be understood that in other embodiments link 98 can be effected via a direct connection between tester 86 and Internet 46, or, particularly where system 30 is based on dynamic IP addresses, a physical version of link 98 can be eliminated altogether. Thus, whether or not link 98 exists by way of a dedicated physical link between host 50 and tester 86, or by way of a virtual connection via Internet 46, it is to be understood that, in general, link 98 provides a means for host 50 to directly monitor, access, and otherwise control the operation of tester 86 from a remote location. By the same token, tester 86 includes firmware that permits verification host 50 to assume control over the operation of tester 86 and issue instructions thereto, and receive responses therefrom. For security purposes, in a present embodiment security features are enabled on tester 86 to reduce the likelihood of unauthorized access to central office 38 via internet 46, but still allow an operator of host 50 to perform an adequate or otherwise desired level of testing of the connectivity to Internet 46 via DSLAM 82. In a present embodiment, such security features are effected, at least in part, by only enabling Telnet and Hypertext Transfer Protocol ("http") ports on tester 86. Further security can be provided by only permitting certain IP addresses, such as the IP address belonging to host 50, to access tester 86. Details about the interaction between access verification host 50 and tester 86 will be explained in greater detail below.

Figure 4:
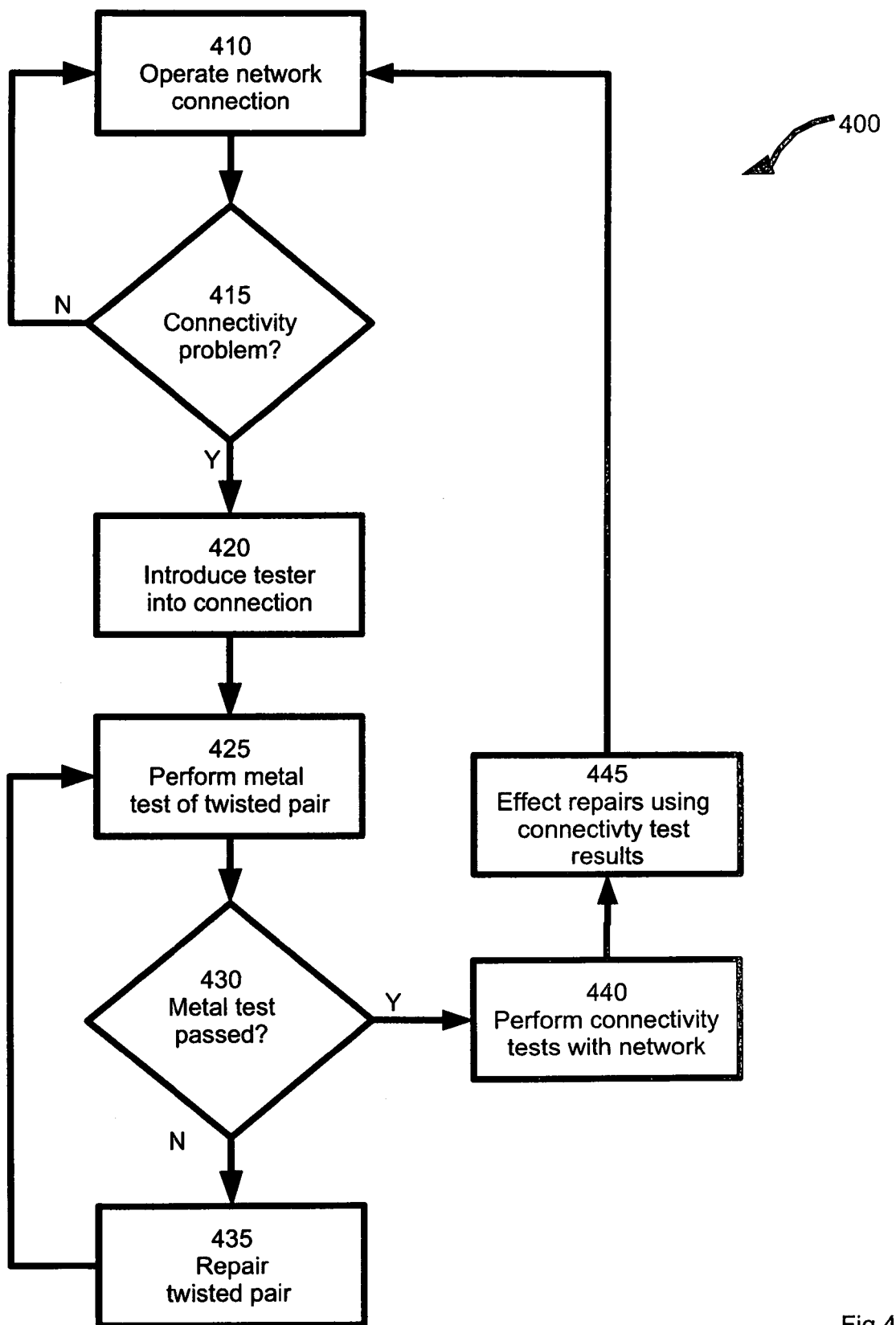
FIG. 4 is a flowchart depicting a method of connection verification in accordance with another embodiment of the invention.

Referring now to FIG. 4, a method for connection verification is indicated generally at 400. In order to assist in the explanation of the method, it will be assumed that method 400 is operated using system 30. Furthermore, the following discussion of method 400 will lead to further understanding of system 30 and its various components. (However, it is to be understood that system 30 and/or method 400 can be varied, and need not work exactly as discussed herein in conjunction with each other, and that such variations are within the scope of the present invention.)

Before discussing method 400, it will be assumed that junction 78 is in the first position shown in FIG. 1, wherein a direct connection exists between modem 70 and DSLAM 82. Beginning at step 410, the network connection is operated in the normal fashion. In system 30, such operation can involve the initialization of communications between modem 70 over Internet 46, or ongoing carrying of communications over Internet 46. Other means of normally operating the Internet connection between client 74 and Internet 46 will occur to those of skill in the art.

At step 415, a determination is made as to whether there is a connectivity problem with the connection that is being operated at step 410. If no such problem exists, the method simply loops back to step 410. However, such a connectivity problem can arise for any variety of reasons. The awareness of such a problem can arise in a variety of ways, but typically arises when a subscriber operating client 74 is unable to maintain or otherwise conduct communications with Internet 70, or when a subscriber operating client 74 experiences communication speeds over Internet 70 that are lower than should be expected. In this situation, the subscriber operating client 74 that believes such connectivity problems are the fault of the service provider operating central office 38, then the subscriber will typically contact the service provider and request that the problem be corrected. Regardless of how a connectivity problem is identified, if it is determined at step 410 that a connectivity problem exists, the method will advance to step 420.

At step 420, a tester is introduced into the network connection with the problem. In system 30, this is effected by placing junction 78 into the second position shown in FIG. 2. This can be performed manually, as can be commonly found in a traditional telephone company structure that operates a central office like central office 38, by having a service technician introduce a "shoe" that shunts tester 86 into the connection between DSLAM 82 and twisted pair 58. In other embodiments, where junction 78 is automated and can be operated remotely, a user at host 50 (who is typically an employee or other representative of the service provider) will remotely access junction 78 via host 50 and issue an instruction to host 50 that is delivered to junction 78 to instruct junction 78 to move from the first position in FIG. 1 to the second position in FIG. 2.

Figure 5:
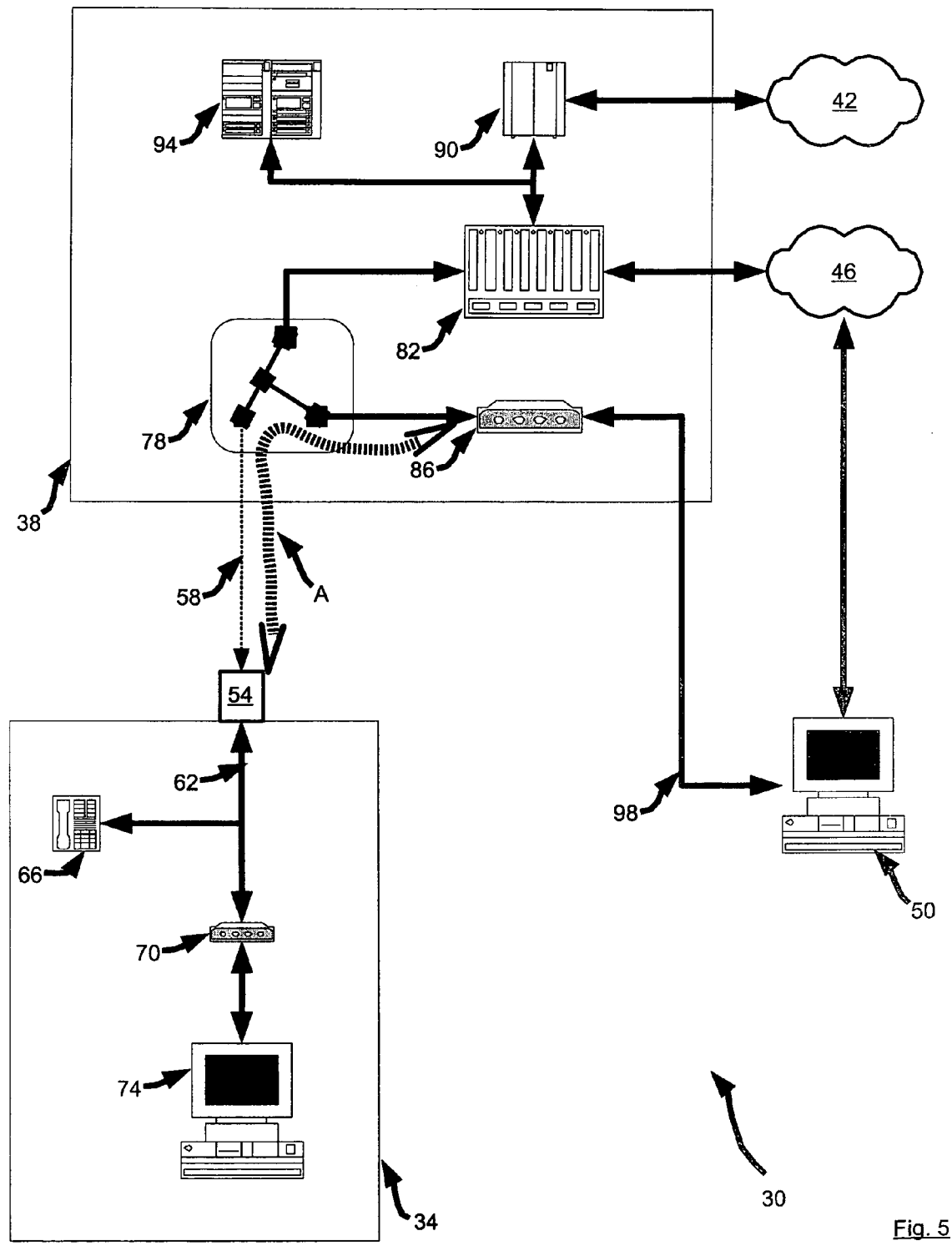
FIG. 5 shows the system in FIG. 2 during the performance of the method in FIG. 4.

Next, at step 425, a metal test is performed on the twisted pair. When implemented on system 30, the user at host 50 will issue an instruction to tester 86 (and/or to any "test heads" associated therewith), to perform a standard set of physical tests of twisted pair 58. This is represented in FIG. 5 by the dotted line indicated at reference character "A". Dotted line A shows the pathway of the various electrical pulses that are delivered down twisted pair 58 by tester 86 to ascertain the physical integrity of twisted pair 58.

Next, at step 430, a determination is made as to whether the metal test performed at step 425 "passed". If the metal test did not pass, (i.e, it "failed" in that negative results were obtained which indicated a failure or degradation of twisted pair 58 such that twisted pair 58 was shown to be unable to physically carry an Internet connection between DSLAM 82 and modem 70) then the method will advance to step 435, at which point standard repair procedures of twisted pair 58 will be effected. Once the repairs are effected at step 435, in a present embodiment, method 400 returns to step 425 and the metal test is performed again.

If, at step 430, it is determined that the metal test passed, the method advances to step 440. At step 440, connectivity tests with the network are performed. These tests can typically be performed with junction 78 in the second position shown in FIG. 2, however, where interference or noise is occurring over twisted pair 58 (i.e. from modem 70), then it can be desired to effect step 440 with junction 78 in the third position in FIG. 3, wherein twisted pair 58 is disconnected from DSLAM 82. However, in the present example, it will be assumed that step 430 is performed with junction 78 in the second position. It will be further assumed that system 30 operates based on DHCP. Thus, when step 440 is performed, once tester 86 is connected to DSLAM 82, tester 86 will attempt to initiate an Internet connection with DSLAM 82 in substantially the same manner as modem 70 would have attempted with DSLAM 82 if system 30 was operating normally with junction 78 in the first position shown in FIG. 1. Thusly, tester 86 will attempt to obtain an IP address, and, if DSLAM 82 (and/or the port on DSLAM 82 through which tester 86 is connected) is operating properly, then DHCP server 94 will assign an IP address to tester 86.

If, for example, tester 86 is unsuccessful at even obtaining an IP address, however, then a failure will be detected within central office 38 and the method will advance to step 445 where repairs can be effected. Such failure to even obtain an IP address by tester 86 can be reported back to host 50 via link 98 (where link 98 is operable without the need such an IP address), and the user at host 50 can dispatch repair personnel to central office 38 to investigate and/or effect repairs. Once repairs are effected, method 400 returns to step 410 where normal network operation can resume.

Figure 6:
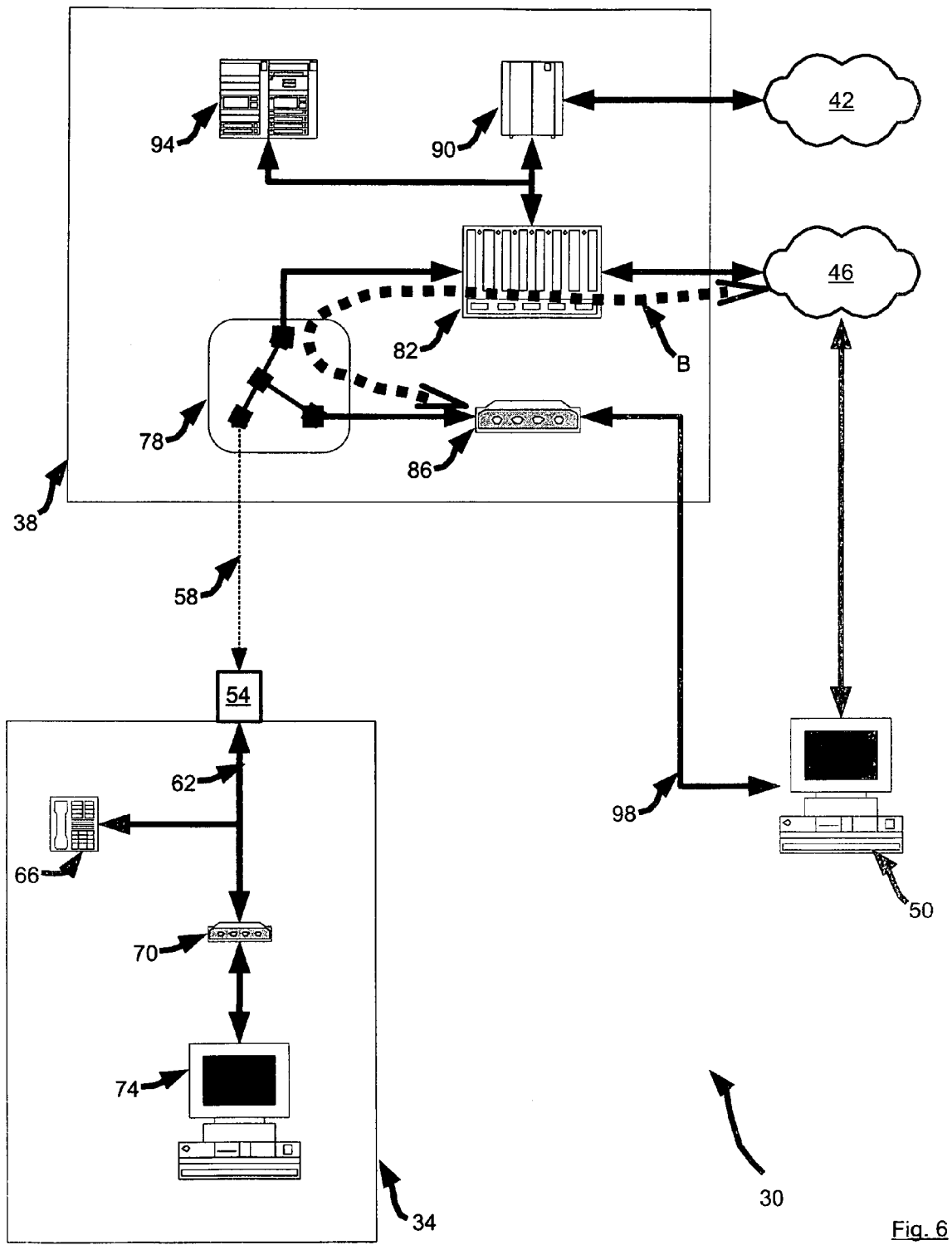
FIG. 6 shows the system in FIG. 2 during the performance of the method in FIG. 4; and, FIG. 7 is a schematic representation of a system for connection verification in accordance with another embodiment of the invention.

Other factors can contribute to a failure of the performance of tests at step 440. For example, assuming that tester 86 succeeds in obtaining an IP address from DHCP server 94, it is contemplated then that tester 86 will report this success, and this IP address, back to host 50, either via internet 46, or via link 92. Once host 50 has determined that an IP address has been assigned to tester 86, host 50 can then perform a variety of tests to ascertain the quality of the connection. Such a connection is represented in FIG. 6 by the dotted line indicated at reference character "B". With a connection established according to dotted line "B", host 50 can then send a plurality of test messages, such as by "pinging" tester 86 via Internet 46. Ping statistics (i.e. packet loss, round trip times, etc.) returned to host 50 can then be used by the user at host 50 to determine the quality of the connection represented by dotted line "B".

If such ping statistics are abnormal, then the user at host 50 can then determine that the connectivity problems lie somewhere along the path represented by dotted line "B" (or even farther along Internet 46), and, at step 445, can implement such steps as are needed to resolve such connectivity problems.

If such ping statistics appear normal, the user at host 50 can then determine that the connectivity problem perceived at step 415 does not lie anywhere in the path between junction 54 and Internet 46, and can accordingly relate to the subscriber at premises 34 that the source of the connectivity problem perceived at step 415 most likely resides within premises 34. In this situation, the repairs effected at step 445 are then carried out under the responsibility of the subscriber at premises 34, either by engaging the services of the service provider that owns central office 38, or such other means at the disposal of the subscriber. Once such repairs are effected, the method returns to step 410.

Figure 7:
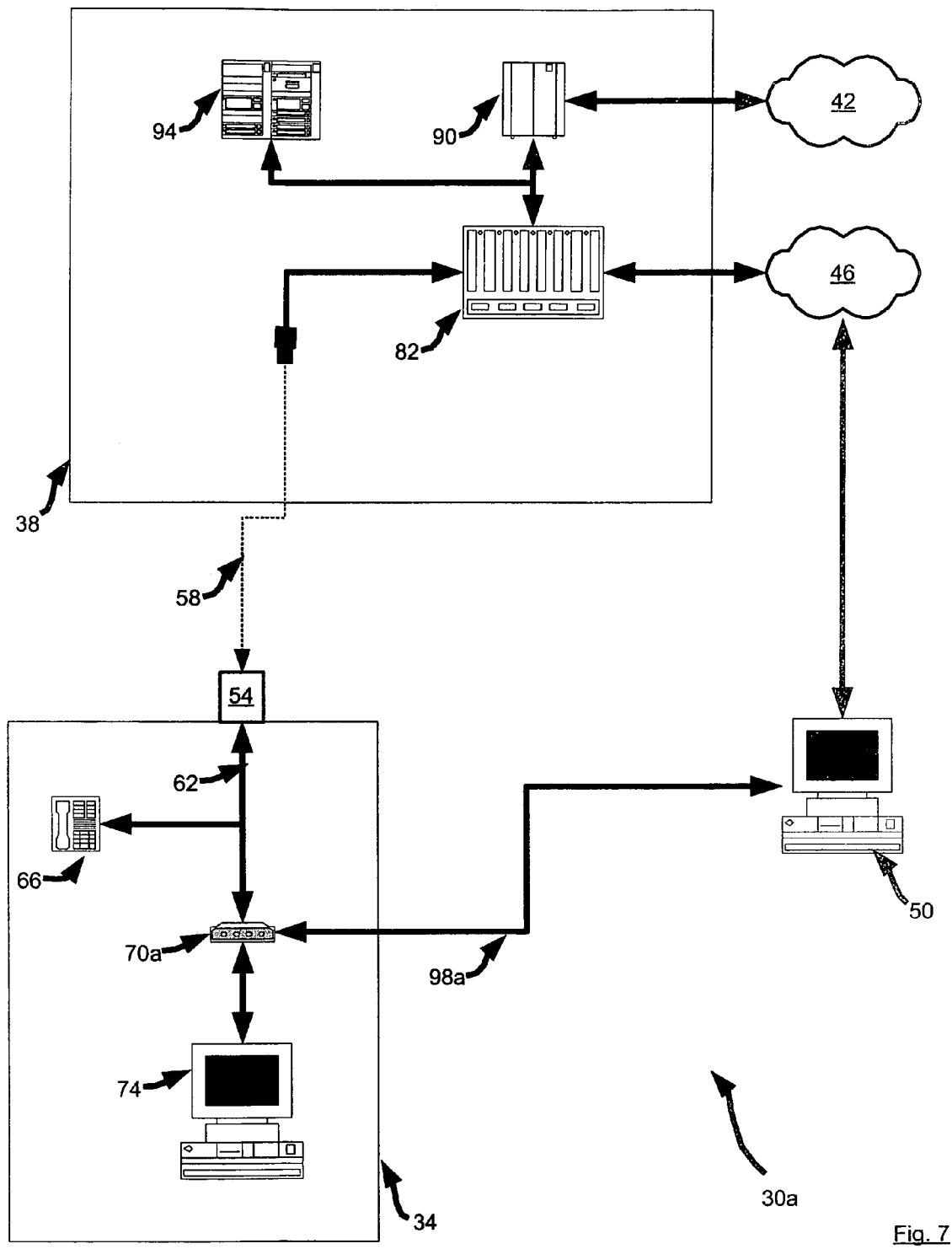

Referring now to FIG. 7, a system for connection verification is indicated at 30a in accordance with another embodiment of the invention. System 30a is substantially the same as system 30, and like items bear like references. In contrast to system 30, however, system 30a includes a smart modem 70a that is resident at subscriber premises 34. Smart modem 70a includes the features of modem 70 in system 30, but also includes the features of tester 86 in system 30. Thus, modem 70 is operable to perform "metal tests" along twisted pair 58, but originating those tests from subscriber premises 34. Smart modem 70a is also connected to host 50 via a link 98a, so that host 50 can issue instructions to and otherwise control smart modem 70a from the remote location where host 50 is located.

Link 98a can be effected in a variety of ways, such as a traditional PSTN dial-up modem connection. Alternatively, where smart modem 70a is DHCP enabled, then link 98a can be a virtual link that physically exists along twisted pair 58. In this example, if host 50 is unable to even communicate with smart modem 70a, and assuming that the subscriber at premises 34 can verify a physical connection of smart modem 70a to junction 54, then a connectivity problem between junction 54 and Internet 46 can be assumed by a user at host 50. However, if modem 70a is able to report its IP address back to host 50, then host 50 can use link 98a to instruct smart modem 70a to perform connectivity tests between modem 70a and internet 46, of the nature previously described with regard to method 400.

While only specific combinations of the various features and components of the present invention have been discussed herein, it will be apparent to those of skill in the art that desired subsets of the disclosed features and components and/or alternative combinations of these features and components can be utilized, as desired. For example, while system 30 in FIG. 1 includes a variety of POTS equipment, including telephone 66, switch 90 and PSTN 42, it is to be understood that these elements can all be omitted in other embodiments of the invention.

Further, where modem 70 of system 30 has a static IP address, and does not rely on DHCP server 94, then as another variation on method 400, host 50 will inform tester 86 of an IP address that can be used when connectivity tests are performed at step 440.

Furthermore, it should be understood that, while method 400 contemplates the existence of a connectivity problem at step 415, it should be understood that the teachings herein can be applied to verify connections on a proactive basis, or other circumstances where no actual connectivity problem has been detected or even exists. By the same token, it should be understood that the effecting of repairs at steps 435 and 445 can be omitted where no problem actually exists and/or is otherwise handled differently. Similarly, it can be desired to omit the performance of the metal test at step 425 altogether, if desired or appropriate. For example, it can be desired to omit the metal test at step 425 when it is desired to run a complete set of tests on all ports of DSLAM 82. Other variations on method 400 will now occur to those of skill in the art.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A method of verifying a connection between a subscriber station and a network wherein a gateway resides intermediate the subscriber station and the network, the method comprising the steps of:

introducing a tester into the connection;
remotely instructing the tester to perform at least one connectivity test between the gateway and the network; and
generating an output reporting a result of the at least one connectivity test,
wherein the remote instructions originate from a verification host connected to the tester and the report is outputted to the verification host,
wherein the network is a proprietary network belonging to an internet service provider, and
wherein the at least one connectivity test comprises "pinging" the tester from the host via the Internet.

2. A method of verifying a connection between a subscriber station and a network wherein a gateway resides intermediate the subscriber station and the network, the method comprising the steps of:

introducing a tester into the connection;
remotely instructing the tester to perform at least one connectivity test between the gateway and the network; and
generating an output reporting a result of the at least one connectivity test,
wherein the remote instructions originate from a verification host connected to the tester and the report is outputted to the verification host,
wherein the network is a proprietary network belonging to an internet service provider, and
wherein the report includes ping statistics delivered to the host.

3. A method of verifying a connection between a subscriber station and a network wherein a gateway resides intermediate the subscriber station and the network, the method comprising the steps of:
   introducing a tester into the connection;
   remotely instructing the tester to perform at least one connectivity test between the gateway and the network; and
   generating an output reporting a result of the at least one connectivity test,
   wherein the remote instructions originate from a verification host connected to the tester and the report is outputted to the verification host,
   wherein the network is the Internet, and
   wherein the verification host is connected to the tester via a virtual link through the Internet.

4. The method according to claim 3 wherein the subscriber station has a dynamic IP address and further comprising the steps of, after the introducing step:
   remotely providing the dynamic IP address to the tester via a DHCP server;
   sending the dynamic IP address from the tester to the host via the Internet.

5. The method according to claim 3 wherein the subscriber station has a static IP address and further comprising the step of remotely providing the static IP address to the tester via the link.

6. A system for verifying a connection comprising:
   a subscriber station;
   a network connected to the subscriber station via a gateway, the gateway operable to translate communications between the subscriber station and the network;
   a tester for connection into the network, the tester operable to receive remote instructions to perform at least one connectivity test over at least a portion of a connection spanning the subscriber station and the network; and
   a host connected to the tester for remotely instructing the tester to perform the at least one connectivity test and to receive reports thereof from the tester,
   wherein the tester is further operable to be selectively connected to and disconnected from the network via a remote instruction from the host,
   wherein the at least one connectivity test includes a metal test between the gateway and the subscriber station and wherein the report includes a result of the metal test, and
   wherein the at least one connectivity test comprises "pinging" the tester from the host via the Internet.

7. A system for verifying a connection comprising:
   a subscriber station;
   a network connected to the subscriber station via a gateway, the gateway operable to translate communications between the subscriber station and the network;
   a tester for connection into the network, the tester operable to receive remote instructions to perform at least one connectivity test over at least a portion of a connection spanning the subscriber station and the network; and,
   a host connected to the tester for remotely instructing the tester to perform the at least one connectivity test and to receive reports thereof from the tester,
   wherein the network is the Internet, and
   wherein the report includes ping statistics delivered to the host.

8. A system for verifying a connection comprising:
   a subscriber station;
   a network connected to the subscriber station via a gateway, the gateway operable to translate communications between the subscriber station and the network;
   a tester for connection into the network, the tester operable to receive remote instructions to perform at least one connectivity test over at least a portion of a connection spanning the subscriber station and the network; and,
   a host connected to the tester for remotely instructing the tester to perform the at least one connectivity test and to receive reports thereof from the tester,
   wherein the tester is further operable to be selectively connected to and disconnected from the network via a remote instruction from the host,
   wherein the at least one connectivity test includes a metal test between the gateway and the subscriber station and wherein the report includes a result of the metal test, and
   wherein the verification host is connected to the tester via a virtual link through the Internet.

9. A system for verifying a connection comprising:
   a subscriber station;
   a network connected to the subscriber station via a gateway, the gateway operable to translate communications between the subscriber station and the network;
   a tester for connection into the network, the tester operable to receive remote instructions to perform at least one connectivity test over at least a portion of a connection spanning the subscriber station and the network;
   a host connected to the tester for remotely instructing the tester to perform the at least one connectivity test and to receive reports thereof from the tester; and
   a DHCP server operable to assign an IP address to the subscriber station and further operable to assign an IP address to the tester when the tester is introduced into the connection,
   wherein the tester is further operable to send the dynamic IP address from the tester to the host via the Internet,
   wherein the tester is further operable to be selectively connected to and disconnected from the network via a remote instruction from the host, and
   wherein the at least one connectivity test includes a metal test between the gateway and the subscriber station and wherein the report includes a result of the metal test.

10. The system according to claim 9 wherein the subscriber station has a static IP address and wherein the host is further operable to providing the static IP address to the tester via the link.

* * * * *